(12) United States Patent
Yang et al.

(10) Patent No.: US 10,757,729 B2
(45) Date of Patent: *Aug. 25, 2020

(54) REDUCING AUDIO DELAY FOR MIXED MODE DELIVERY OF AUDIO TRANSMISSIONS

(71) Applicant: MOTOROLA SOLUTIONS, INC., Chicago, IL (US)

(72) Inventors: Yunhai Yang, Elgin, IL (US); Daniel J. McDonald, Cary, IL (US); Ruth A. Varela, Rolling Meadows, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/438,125

(22) Filed: Jun. 11, 2019

(65) Prior Publication Data
US 2020/0068611 A1 Feb. 27, 2020

Related U.S. Application Data

(63) Continuation of application No. 16/111,878, filed on Aug. 24, 2018, now Pat. No. 10,455,613.

(51) Int. Cl.
*H04W 72/14* (2009.01)
*H04W 4/08* (2009.01)
*G06N 20/00* (2019.01)

(52) U.S. Cl.
CPC .......... *H04W 72/14* (2013.01); *G06N 20/00* (2019.01); *H04W 4/08* (2013.01)

(58) Field of Classification Search
CPC .................................................. H04W 72/14
See application file for complete search history.

(56) References Cited

U.S. PATENT DOCUMENTS

2012/0082098 A1 * 4/2012 Oprescu-Surcobe ........................ H04W 72/0406
370/329

\* cited by examiner

*Primary Examiner* — Ankur Jain
(74) *Attorney, Agent, or Firm* — Michael Best & Friedrich LLP

(57) ABSTRACT

Systems and methods for reducing audio delay for mixed mode delivery of audio transmissions. One example system includes a communication interface communicatively coupled to a communication network, and an electronic processor. The electronic processor is coupled to the communication interface, and configured to receive, via the communication interface, a group call request for a talkgroup. The electronic processor is configured to transmit, in response to receiving the group call request, a call grant message to a plurality of subscriber units affiliated with the talkgroup. The electronic processor is configured to determine, using a machine learning algorithm, a subset of the plurality of subscriber units based on a call grant response time, and, while a transmission hold-off timer has not expired, when a call grant response has been received from each of the subscriber units of the subset, forward an audio transmission to the subset based on the group call request.

18 Claims, 3 Drawing Sheets

REDUCING AUDIO DELAY FOR MIXED MODE DELIVERY OF AUDIO TRANSMISSIONS

BACKGROUND OF THE INVENTION

Radio communications are used for a variety of reasons and situations. For example, radio communications may be used by first responders, event organizers, and others where it is necessary to communicate with others who are often remote from one another. Many times, radio communications are sent simultaneously, so that a group of communication device users can receive an audio signal or message at the same time. However, if the communication devices receive the transmissions at different times, whether due to the devices being connected via different networks or simply having different audio reception speeds, then audio from nearby communication devices will interfere with one another. A user of a communication device may in this instance have difficulty understanding the audio output based on the audio signal (or transmission) due to echoes coming from nearby communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
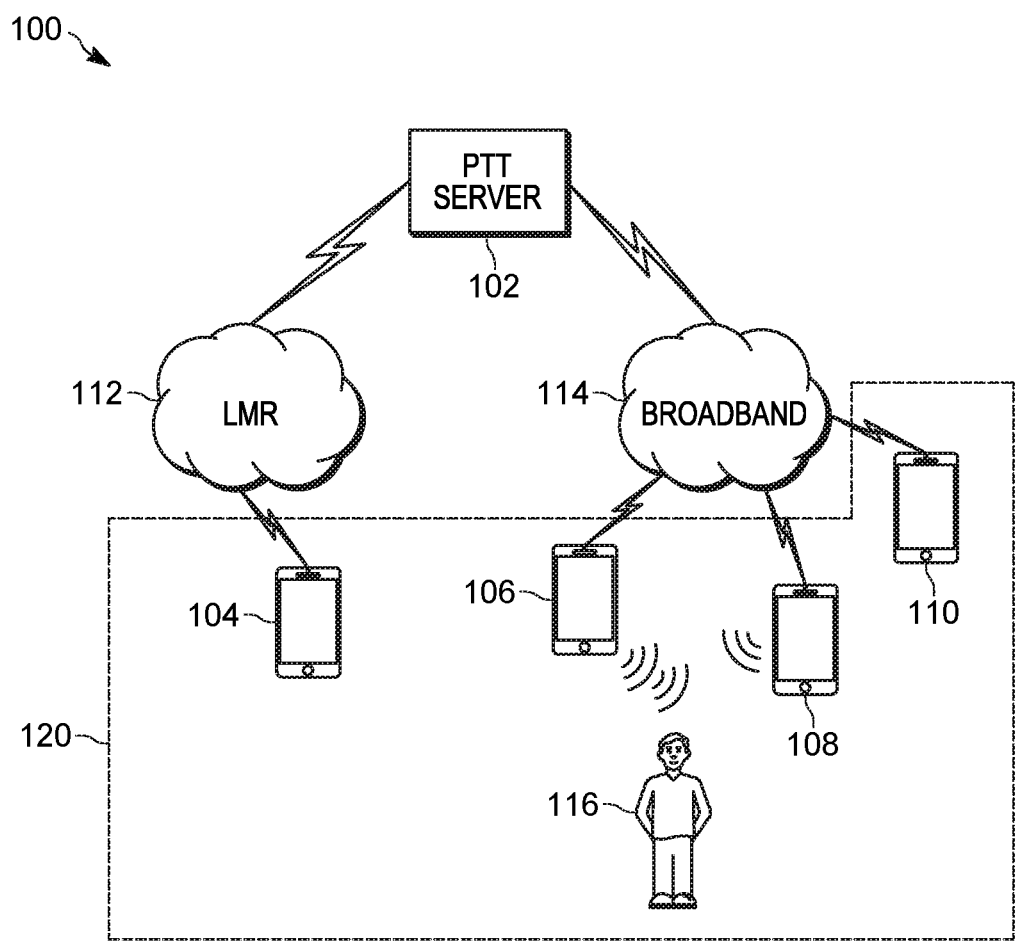
FIG. 1 is a diagram of a communication system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted above, varied timing among communication devices in the receipt of audio transmissions can be problematic. As also noted, varied timing may be caused by a variety of conditions or factors. In the past, attempts have been made to allow a group of communication devices with push-to-talk features to receive audio transmissions simultaneously. One approach to solve the problem is simply combining these features and allowing the audio through to each communication device in a system when the audio reaches that device. However, under this approach, audio transmissions will reach each communication device at different times, with no synchronization based on location or speed of the communication device. Using this approach, two nearby communication devices could output audio with just a slight overlap or delay to a complete echo making it difficult for either user to hear their own audio output.

Another approach to addressing the same problem is to wait for all communication devices to connect before sending an audio transmission. However, in any group of communication devices, the group may consist of some communication devices with fast links, and other communication devices with slow links, and the device-connection speeds may be unknown to the network infrastructure. Because of this variance in connection speeds, there is difficulty in a wait-for-all-devices-to-connect approach, as every communication device in the system would be forced to wait for the slowest communication device in the system, including the example case wherein one communication device never connects. Some communication devices may have extreme delays, and causing all user devices to wait for audio to be transmitted is not an optimal solution, as it wastes valuable time, for example, time on the job. In cases where a communication device never connects, audio transmissions are never received.

Certain embodiments provide, among other things, reduced audio delay for mixed mode delivery of audio transmissions by, in one example, utilizing machine learning and call grant response time data to develop subsets of users of communication devices. Machine learning may involve using clustering algorithms from unsupervised machine learning, such as k-means (with weighted evaluations), to cluster devices (for example, subscriber units) based on their response time. Devices within a cluster would have similar response times. For example, the system would automatically learn and put devices with similar response times together, creating at least a fast response cluster, a medium response cluster, and a slow response cluster. The slow response cluster may be, for example, devices with satellite connections. In some embodiments, the PTT Server could try to synchronize voice for each cluster separately. Certain embodiments also update the call grant response time data based on a plurality of historical subscriber unit response times, subscriber unit location data, and subscriber unit user metadata. For example, utilizing machine learning, a call grant response time for a particular device may change over time, based on the history of location data, subscriber unit user metadata, and response times for that device.

Some embodiments determine a plurality of weighted historical subscriber unit response times based on a received time for each of the plurality of historical subscriber unit response times and update the call grant response time based on the plurality of weighted historical subscriber unit response times. For example, when looking at the history of location data, subscriber unit user metadata, and response times, a machine learning algorithm may weigh more recent data more heavily than older data, as more recent data may be more representative of the devices actual current response time. Additionally, the machine learning algorithm may assign a weight to the relative distance from where a data point was taken to the device's current location. These and other embodiments increase the speed of communications, while reducing undesirable effects of delayed communications, for example audio echoing. Thus, certain embodiments described herein provide more efficient use of communication system resources and improved operation of the communication systems for users, for example, public safety personnel.

One example embodiment provides a system for reducing audio delay for mixed mode delivery of audio transmissions. The system includes a communication interface configured to be communicatively coupled to a communication network and an electronic processor. The electronic processor is coupled to the communication interface, and configured to receive, via the communication interface, a group call request for a talkgroup. The electronic processor is configured to transmit, in response to receiving the group call request, a call grant message to a plurality of subscriber units, the plurality of subscriber units affiliated with the talkgroup. The electronic processor is configured to determine, using a machine learning algorithm, a subset of the plurality of subscriber units based on a call grant response time. The electronic processor is configured to, while a transmission hold-off timer has not expired, when a call grant response has been received from each of the subscriber units of the subset, forward an audio transmission to the subset based on the group call request.

Another example embodiment provides a method for reducing audio delay for mixed mode delivery of audio transmissions. The method includes receiving, via a communication interface communicatively coupled to a communication network, a group call request for a talkgroup. The method includes transmitting, in response to receiving the group call request, a call grant message to a plurality of subscriber units, the plurality of subscriber units affiliated with the talkgroup. The method includes determining, with an electronic processor using a machine learning algorithm, a subset of the plurality of subscriber units based on a call grant response time. The method includes, while a transmission hold-off timer has not expired, forwarding an audio transmission to the subset based on the group call request when a call grant response has been received from each of the subscriber units of the subset.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

FIG. 1 illustrates an example communication system 100. The communication system 100 includes a PTT server 102, a land mobile radio (LMR) network 112, a broadband network 114, and communication devices 104, 106, 108, and 110. The communication devices 104, 108, 108, and 110 are sometimes referred to as subscriber units. A user 116 of communication device 108 may carry the communication device 108, for example, on a belt or within a pants pocket. The user 116 is also in close proximity to communication device 106 (for example, within about twenty (20) feet or less). Communication devices 104, 106, 108, and 110 additionally form talkgroup 120. In this embodiment, communication device 104 is connected to LMR network 112, while communication devices 106, 108 and 110 are connected to broadband network 114.

Figure 2:
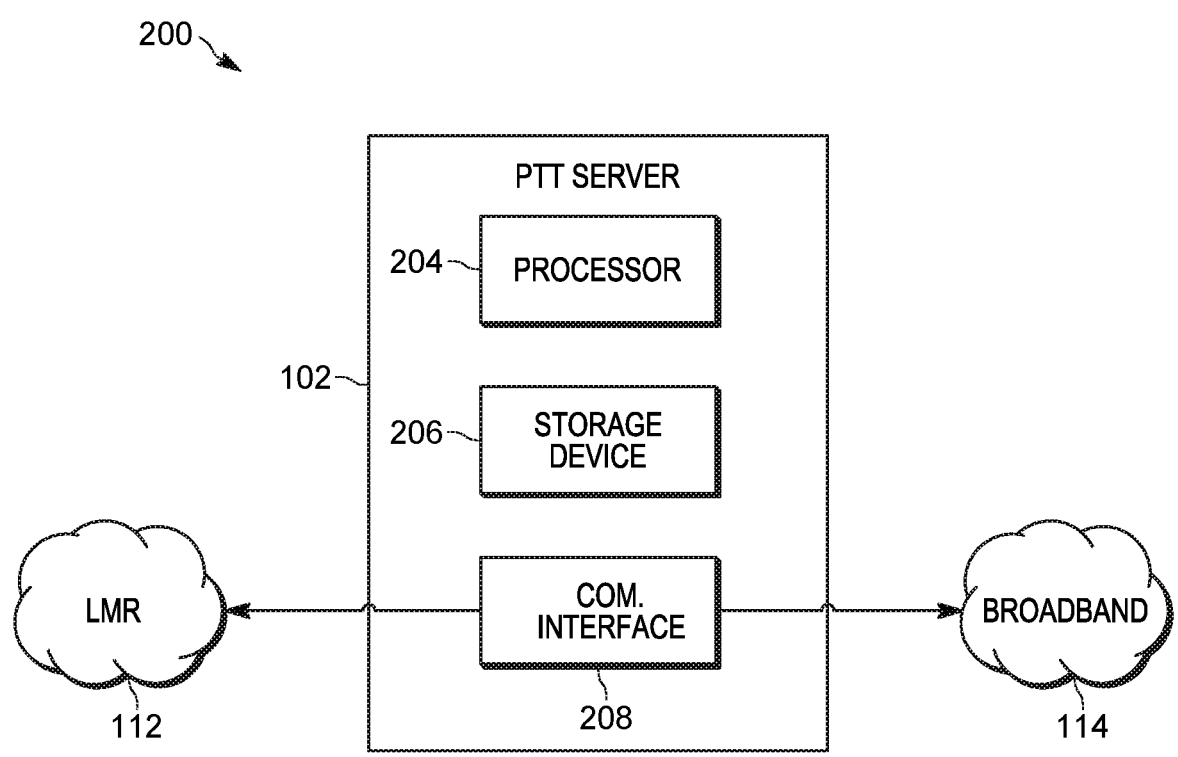
FIG. 2 is a diagram of a server included in the communication system of FIG. 1, in accordance with some embodiments.

The PTT server 102, described more particularly below with respect to FIG. 2, is also communicatively coupled to the two networks. A user 116 may be in close proximity to multiple communication devices, such as communication device 106 and 108, and therefore may hear audio output from both at the same time. Because of this, communication devices 106 and 108 may cause an echo if their respective audio transmissions are unsynchronized, and therefore communication system 100 is set up to synchronize audio transmissions between devices with different speeds and different networks to reduce echoes.

FIG. 1 illustrates a graphical representation of an example talkgroup 120 that includes the communication devices 106 through 110. Although each communication device 106 through 110 is shown affiliated with talkgroup 120, devices 106 through 110 may be associated with one or more other talkgroups. In addition, throughout the following description, reference is made to the talkgroup 120 and the communication devices 106 through 110 to provide examples of the methods and systems being explained. The talkgroup 120 is merely exemplary and has been simplified for the sake of explanation. In some embodiments, the communication system 100 includes more or fewer communication devices and more or fewer talkgroups. In some embodiments, the talkgroups have more or fewer affiliated communication devices. In some embodiments, the talkgroups do not have the same number of affiliated communication devices. While FIG. 1 illustrates four communication devices 104, 106, 108, and 110, it should be understood that embodiments of the method 300 may be used to reduce audio delay for more communication devices and talkgroups than illustrated.

As described in more detail below with respect to FIG. 3, the PTT server 102 is configured to receive a group call request for a talkgroup from one of the LMR network 112 or the broadband network 114. The server transmits the call grant message to each of the communication devices 104, 106, 108, and 110 via the electronic processor 204 (which is described in greater detail with respect to FIG. 2). The electronic processor 204 of the PTT server 102 then determines using, for example, a machine learning algorithm, a subset of the plurality of communication devices 104, 106, 108, and 110. In some embodiments, the machine learning algorithm is an unsupervised machine learning algorithm. While a transmission hold-off timer has not expired, the electronic processor 204 forwards an audio transmission to the subset when each of the subset of the communication devices 104, 106, 108, and 110 has responded to the group call request. A transmission hold-off timer can be preconfigured or learned from the same unsupervised machine learning algorithm described above. The output of the machine learning algorithm includes the clusters and the average response time delay of the clusters, which can be used to determine the length of the transmission hold-off timer.

FIG. 2 schematically illustrates the PTT server 102 in more detail. In the example provided, the PTT server 102 includes an electronic processor 204, a storage device 206, and a communication interface 208. The electronic processor 204, the storage device 206, and the communication interface 208 communicate over one or more communication lines or buses. Wireless connections or a combination of wired and wireless connections are also possible.

The electronic processor 204 may include a microprocessor, application-specific integrated circuit (ASIC), field-programmable gate array, or another suitable electronic device. The electronic processor 204 obtains and provides information (for example, from the storage device 206 and/or the communication interface 208), and processes the information by executing one or more software instructions or modules, capable of being stored, for example, in a random access memory ("RAM") area of the storage device 206 or a read only memory ("ROM") of the storage device 206 or another non-transitory computer readable medium (not shown). The software can include firmware, one or more applications, program data, filters, rules, one or more program modules, and other executable instructions. The electronic processor 204 is configured to retrieve from the storage device 206 and execute, among other things, software related to the control processes and methods described herein.

The storage device 206 can include one or more non-transitory computer-readable media, and may include a program storage area and a data storage area. The program storage area and the data storage area can include combinations of different types of memory, as described herein. In the embodiment illustrated, the storage device 206 stores, among other things, instructions for the processor to carry out the method of FIG. 3, and historical data about the communication devices 104, 106, 108, and 110 of each network 112, and 114 (both described in detail below).

The communication interface 208 may include a transceiver (for example, a Wi-Fi or Ethernet transceiver) for communicating over one or more wired or wireless communication networks (for example, the land mobile radio (LMR) network 112 or the broadband network 114) or connections.

In some embodiments, the PTT server 102 performs machine learning functions, as described above. Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using all of these approaches, a computer program can ingest, parse, and understand data, and progressively refine algorithms for data analytics.

As noted, audio delay caused by mixed mode delivery of audio transmissions can create echoes between nearby communication devices. Accordingly, FIG. 3 illustrates a method 300 for reducing audio delay for mixed mode delivery of audio transmissions. The method 300 is described as being performed by the PTT server 102 and, in particular, the electronic processor 204. However, it should be understood that in some embodiments, portions of the method 300 may be performed by other devices, including for example, the storage device 206 or communication interface 208.

Figure 3:
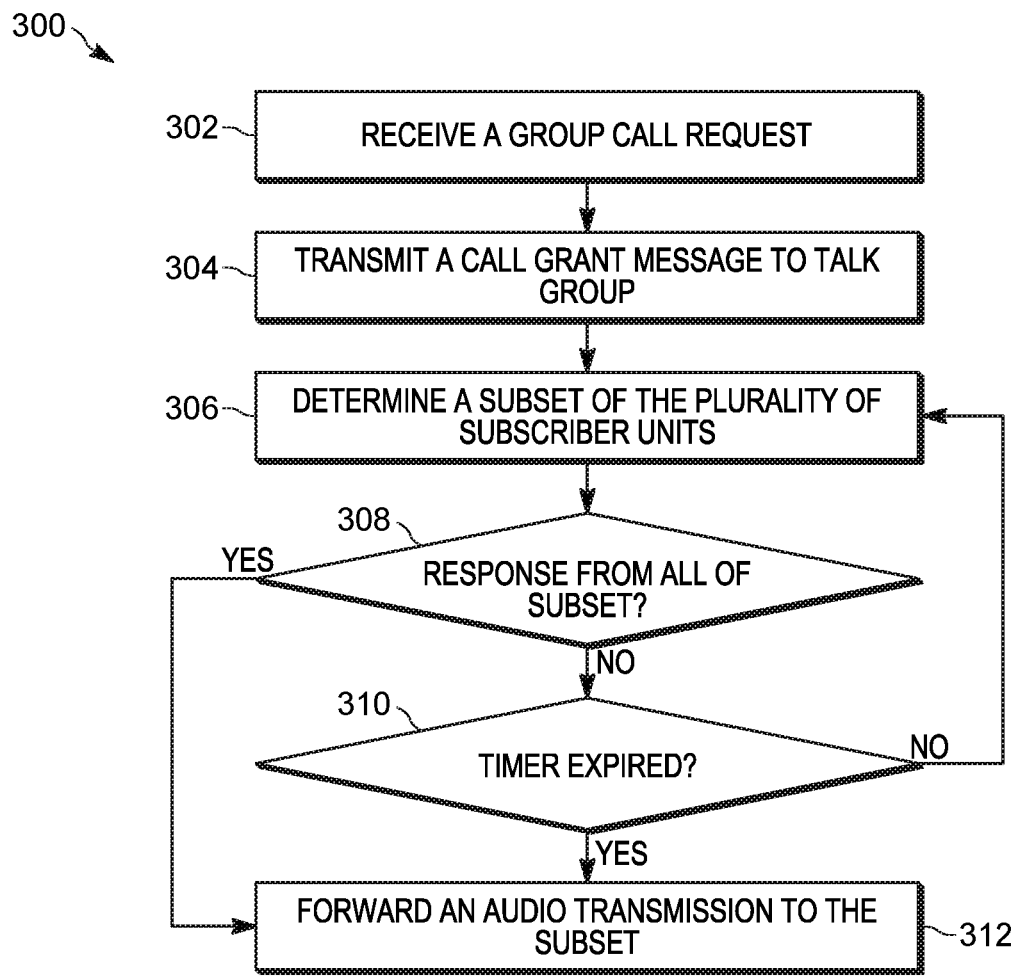
FIG. 3 is a flowchart of a method for reducing audio delay for mixed mode delivery of audio transmissions, in accordance with some embodiments.

As illustrated in FIG. 3, at block 302, the electronic processor 204 receives a group call request from one of the LMR network 112 or the broadband network 114. For example, a group call request may be a request from one of the communication devices to send an audio transmission to the communication devices in that talkgroup. In response to this, at block 304, the electronic processor 204 transmits a call grant message to each radio in a talkgroup consisting of a plurality of communication devices. The talkgroup may include communication devices from both the LMR network 112 and the broadband network 114, and each of the communication devices may operate and respond to the group call request at varying speeds.

At block 306, the electronic processor 204 determines a subset of the plurality of communication devices. Determination of the subset of the plurality of communication devices may include machine learning, and the subset of communications devices may be a group of communication devices determined to respond to the group call request at faster speeds than other communication devices of the plurality. In some embodiments, determination of the subset includes the electronic processor 204 updating call grant response times using a machine learning algorithm based on at least on historical subscriber unit response times, subscriber unit location data, and subscriber unit user metadata. Historical subscriber unit response times may be response times for a specific communication device to previous call grant requests. Subscriber unit location data may be GPS coordinate location or other tracking data for the location of a communication device, and subscriber unit user metadata may be a priority level of a communication device.

In some embodiments, these updates to the call grant response times may be weighted, for example a more recent call response time may be weighed more than a call grant time from a month ago when determining the call grant response time for that communication device. Similarly, subscriber unit location data that is more recent may be weighed more heavily than previous location data, or in some embodiments may be the only location data taken into consideration when determining the call grant response time for that communication device. In some embodiments, when multiple subscriber units are within a certain proximity (for example, less than 20 yards away), the machine learning algorithm may use this information for clustering the subscriber units and creating the subset of subscriber units. In some embodiments, the electronic processor 204 may wait until a response is received from all radios in that proximity before transmitting an audio signal.

At block 308, the electronic processor 204 checks to see if there is a response from all of the communication devices of the subset. If there is a response from all of the subset of the communication devices, then the electronic processor 204 proceeds to block 312, where it forwards an audio transmission to the subset. If there is not a response from all of the subset of the communication devices, then the electronic processor 204 proceeds to block 310, where the electronic processor checks to see if a transmission hold-off timer has expired. If a transmission hold-off timer has expired, then the electronic processor proceeds to block 312 and forwards the audio transmission to the subset of the communication devices.

In one embodiment, if a transmission hold-off timer expires before all of the communication devices of the subset respond, then the audio transmission is sent regardless of not having a response from all of the communication devices of the subset. In some embodiments, the subscriber unit user metadata includes at least one critical user identifier (for example, a unique alphanumeric identifier associated with a user of the subscriber unit), which identifies a user who should receive the audio transmission. For example, a supervisor commanding an incident response team may be considered a critical user for audio transmissions directed to a talkgroup for the incident response team. In such embodiments, the electronic processor 204 is configured to hold the audio transmission until a call grant response has been received from a subscriber unit associated with the at least one critical user identifier, regardless of the transmission hold-off timer status. If the timer has not expired, then the electronic processor resets to block 306 and proceeds to re-determine a subset of the plurality of communication devices.

In some embodiments, the electronic processor 204 will forward the audio transmission while a hold-off timer has not expired when a call grant response has been received from each of a minimum threshold of subscriber units from the subset, rather than waiting for every user in the subset. In another embodiment, the electronic processor 204 will forward the audio transmission while a hold-off timer has not expired when a call grant response has been received from each of the identified critical users of the subset. In still other embodiments, when the electronic processor 204 receives a call grant response from a communication device of the subset after the call grant response time has expired, the electronic processor 204 forwards the audio transmission in an unsynchronized fashion to the communication device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 20%, in another embodiment within 10%, in another embodiment within 2% and in another embodiment within 1%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A system to reduce audio delay for mixed mode delivery of audio transmissions, the system comprising:
   a communication interface configured to be communicatively coupled to a communication network; and
   an electronic processor, coupled to the communication interface, and configured to
      receive, via the communication interface, a group call request for a talkgroup,
      transmit, in response to receiving the group call request, a call grant message to a plurality of subscriber units, the plurality of subscriber units affiliated with the talkgroup,
      determine, using a machine learning algorithm, a subset of the plurality of subscriber units based on a call grant response time;
      while a transmission hold-off timer has not expired, when a call grant response has been received from each of the subscriber units of the subset, forward an audio transmission to the subset based on the group call request; and
      update the call grant response time based on a plurality of historical subscriber unit response times, subscriber unit location data, and subscriber unit user metadata.

2. The system of claim 1, further comprising:
a second communication interface configured to be communicatively coupled to a second communication network;
wherein the plurality of subscriber units is connected to the second communication network; and
wherein the electronic processor is coupled to the second communication interface, and further configured to transmit the call grant message to the plurality of subscriber units via the second communication interface.

3. The system of claim 2, wherein the first communication network is a land mobile radio network and the second communication network is a broadband network.

4. The system of claim 1, wherein the electronic processor is further configured to, when the transmission hold-off timer has expired, forward the audio transmission to the subset based on the group call request.

5. The system of claim 1, wherein the electronic processor is further configured to
determine a plurality of weighted historical subscriber unit response times based on a received time for each of the plurality of historical subscriber unit response times; and
update the call grant response time based on plurality of weighted historical subscriber unit response times.

6. The system of claim 1, wherein the subscriber unit user metadata includes at least one critical user identifier, and
wherein the electronic processor is further configured to hold the audio transmission until a call grant response has been received from a subscriber unit associated with the at least one critical user identifier, regardless of the transmission hold-off timer status.

7. The system of claim 1, wherein the electronic processor is further configured to, while a transmission hold-off timer has not expired, when a call grant response has been received from each of a minimum threshold of subscriber units of the subset, forward the audio transmission.

8. The system of claim 1, wherein the electronic processor is further configured to
receive a call grant response from a subscriber unit of the subset after the call grant response time has expired, and
forward the audio transmission in an unsynchronized fashion to subscriber unit.

9. The system of claim 1, wherein the machine learning algorithm is an unsupervised machine learning algorithm.

10. A method for reducing audio delay for mixed mode delivery of audio transmissions, the method comprising:
receiving, via a communication interface communicatively coupled to a communication network, a group call request for a talkgroup,
transmitting, in response to receiving the group call request, a call grant message to a plurality of subscriber units, the plurality of subscriber units affiliated with the talkgroup,
determining, with an electronic processor using a machine learning algorithm, a subset of the plurality of subscriber units based on a call grant response time;
while a transmission hold-off timer has not expired, forwarding an audio transmission to the subset based on the group call request when a call grant response has been received from each of the subscriber units of the subset; and
updating the call grant response time based on a plurality of historical subscriber unit response times, subscriber unit location data, and subscriber unit user metadata.

11. The method of claim 10, wherein transmitting the call grant message to the plurality of subscriber units includes transmitting the call grant message to a second communication network via a second communication interface.

12. The method of claim 11, wherein
receiving a group call request includes receiving a group call request from a land mobile radio network; and
transmitting the call grant message to a second communication network includes transmitting the call grant message to a broadband network.

13. The method of claim 10, further comprising:
forwarding the audio transmission to the subset based on the group call request when the transmission hold-off timer has expired.

14. The method of claim 10, further comprising:
determining a plurality of weighted historical subscriber unit response times based on a received time for each of the plurality of historical subscriber unit response times; and
updating the call grant response time based on plurality of weighted historical subscriber unit response times.

15. The method of claim 10, further comprising:
holding the audio transmission until a call grant response has been received from a subscriber unit associated with at least one critical user identifier, regardless of the transmission hold-off timer status.

16. The method of claim 10, further comprising:
while a transmission hold-off timer has not expired, forwarding the audio transmission when a call grant response has been received from each of a minimum threshold of subscriber units of the subset.

17. The method of claim 10, further comprising
receiving a call grant response from a subscriber unit of the subset after the call grant response time has expired, and
forwarding the audio transmission in an unsynchronized fashion to subscriber unit.

18. The method of claim 10, determining a subset of the plurality of subscriber units based on a call grant response time includes determining a subset of the plurality of subscriber units using an unsupervised machine learning algorithm.

* * * * *